(12) United States Patent
Andreoli et al.

(10) Patent No.: US 11,186,441 B2
(45) Date of Patent: Nov. 30, 2021

(54) CONVEYOR SYSTEMS AND METHODS

(71) Applicant: REXNORD INDUSTRIES, LLC, Milwaukee, WI (US)

(72) Inventors: Andrea Andreoli, Modena (IT); Cornelis Hendrik Mijndert Menke, S-Gravenzande (NL); Justin Michael Stefanko, Waukesha, WI (US); Philip Michael Gabor, Mequon, WI (US)

(73) Assignee: REXNORD INDUSTRIES, LLC, Milwaukee, WI (US)

( * ) Notice: Subject to any disclaimer, the term of this patent is extended or adjusted under 35 U.S.C. 154(b) by 50 days.

(21) Appl. No.: 16/476,411

(22) PCT Filed: Aug. 31, 2017

(86) PCT No.: PCT/US2017/049598
§ 371 (c)(1),
(2) Date: Jul. 8, 2019

(87) PCT Pub. No.: WO2018/160218
PCT Pub. Date: Sep. 7, 2018

(65) Prior Publication Data
US 2020/0048012 A1  Feb. 13, 2020

(30) Foreign Application Priority Data
Mar. 1, 2017 (WO) .................. PCT/NL2017/50127

(51) Int. Cl.
*B65G 45/02* (2006.01)
*B65G 43/00* (2006.01)
(Continued)

(52) U.S. Cl.
CPC .............. *B65G 45/02* (2013.01); *B65G 43/00* (2013.01); *B65G 43/04* (2013.01); *B65G 45/18* (2013.01);
(Continued)

(58) Field of Classification Search
CPC ........ B65G 43/00; B65G 43/04; B65G 45/02; B65G 45/18; B65G 45/22; B65G 45/24;
(Continued)

(56) References Cited

U.S. PATENT DOCUMENTS 3,053,371 A * 9/1962 Fischer .................. B65G 45/08
198/500
3,938,116 A 2/1976 Schneider
(Continued)

FOREIGN PATENT DOCUMENTS

DE 4337037 A1 5/1995
EP 1790968 A1 5/2007
(Continued)

OTHER PUBLICATIONS

Search Report and Written Opinion, Application No. NL 2016340, dated Nov. 1, 2016, 8 pages.
(Continued)

*Primary Examiner* — Gene O Crawford
*Assistant Examiner* — Keith R Campbell
(74) *Attorney, Agent, or Firm* — Quarles & Brady LLP

(57) ABSTRACT

Embodiments of the invention provide systems and methods for monitoring and removing contaminants from a conveyor surface based upon predicted frictional engagement qualities detected on a conveyor surface. In some examples, the methods may include monitoring the conveyor surface with at least one sensor configured to sense a condition on the conveyor surface. The sensor may detect the presence of a contaminant, and communicate the location of the detected contaminant to a processor. A treatment cycle may then be initiated to remove or displace the contaminant from the conveyor surface after the presence of a contaminant has been detected.

17 Claims, 8 Drawing Sheets

(51) Int. Cl.
*B65G 45/22* (2006.01)
*B65G 45/24* (2006.01)
*G01N 21/86* (2006.01)
*G01N 27/30* (2006.01)
*B65G 43/04* (2006.01)
*B65G 45/18* (2006.01)
*G01N 19/02* (2006.01)

(52) U.S. Cl.
CPC .............. *B65G 45/22* (2013.01); *B65G 45/24* (2013.01); *G01N 19/02* (2013.01); *G01N 21/86* (2013.01); *G01N 27/302* (2013.01); *B65G 2203/0266* (2013.01); *B65G 2203/0283* (2013.01); *B65G 2203/042* (2013.01); *B65G 2203/044* (2013.01); *B65G 2203/046* (2013.01)

(58) Field of Classification Search
CPC .... B65G 2203/0266; B65G 2203/0283; B65G 2203/042; B65G 2203/44; B65G 2203/046; G01N 19/02; G01N 21/86; G01N 27/302
See application file for complete search history.

(56) References Cited

U.S. PATENT DOCUMENTS

| | | | |
|---|---|---|---|
| 4,915,209 A | 4/1990 | Canziani | |
| 4,930,600 A | 6/1990 | Kumar et al. | |
| 4,960,200 A | 10/1990 | Pierce | |
| 5,758,761 A | 6/1998 | Selbertinger et al. | |
| 5,797,063 A | 8/1998 | Umezawa et al. | |
| 5,873,946 A | 2/1999 | Hantmann | |
| 6,038,836 A | 3/2000 | Focke et al. | |
| 6,050,391 A | 4/2000 | Terry | |
| 6,302,263 B1 * | 10/2001 | Bennett | B65G 45/02 198/495 |
| 6,321,586 B1 | 11/2001 | Wojtowicz et al. | |
| 6,360,874 B1 * | 3/2002 | Virippil | B65G 45/22 198/495 |
| 6,478,141 B2 | 11/2002 | Virippil et al. | |
| 6,651,803 B2 | 11/2003 | Virippil et al. | |
| 6,851,545 B1 | 2/2005 | Carter | |
| 6,971,503 B2 * | 12/2005 | Thompson | B65G 45/22 198/494 |
| 8,141,695 B2 * | 3/2012 | Kraus | B65G 45/00 198/502.1 |
| 8,297,435 B2 | 10/2012 | Lathem | |
| 8,343,898 B2 | 1/2013 | Ruhr et al. | |
| 8,397,904 B2 * | 3/2013 | Bogle | A23L 3/003 198/810.04 |
| 8,624,203 B2 | 1/2014 | Tullo et al. | |
| 8,939,280 B2 | 1/2015 | Bogle et al. | |
| 2004/0257601 A1 | 12/2004 | Tomiyasu et al. | |
| 2005/0109580 A1 | 5/2005 | Thompson | |
| 2006/0127545 A1 | 6/2006 | Newman | |
| 2007/0119686 A1 | 5/2007 | Divisi | |
| 2010/0243410 A1 | 9/2010 | Hall et al. | |
| 2012/0085622 A1 | 4/2012 | Bryl et al. | |
| 2012/0211645 A1 | 8/2012 | Tullo et al. | |
| 2012/0255576 A1 * | 10/2012 | Hirooka | B65G 45/10 134/9 |
| 2016/0041086 A1 | 2/2016 | Jacques et al. | |
| 2016/0176648 A1 | 6/2016 | Van Den Berg et al. | |
| 2019/0084772 A1 | 3/2019 | Andreoli et al. | |

FOREIGN PATENT DOCUMENTS

| | | |
|---|---|---|
| JP | H10221239 A | 8/1998 |
| JP | 2008065598 A | 3/2008 |
| NL | 2016340 B1 | 9/2017 |
| WO | 2012014322 A1 | 2/2012 |
| WO | 2015020524 A1 | 2/2015 |
| WO | 2015165858 A1 | 11/2015 |

OTHER PUBLICATIONS

PCT International Search Report and Written Opinion, PCT/NL2017/050127, dated Jun. 22, 2017, 12 pages.
PCT International Search Report and Written Opinion, PCT/US2017/049598, dated Nov. 14, 2017, 13 pages.
European Patent Office, Extended European Search Report, Application No. 17899125.3, dated Nov. 30, 2020, 7 pages.

* cited by examiner

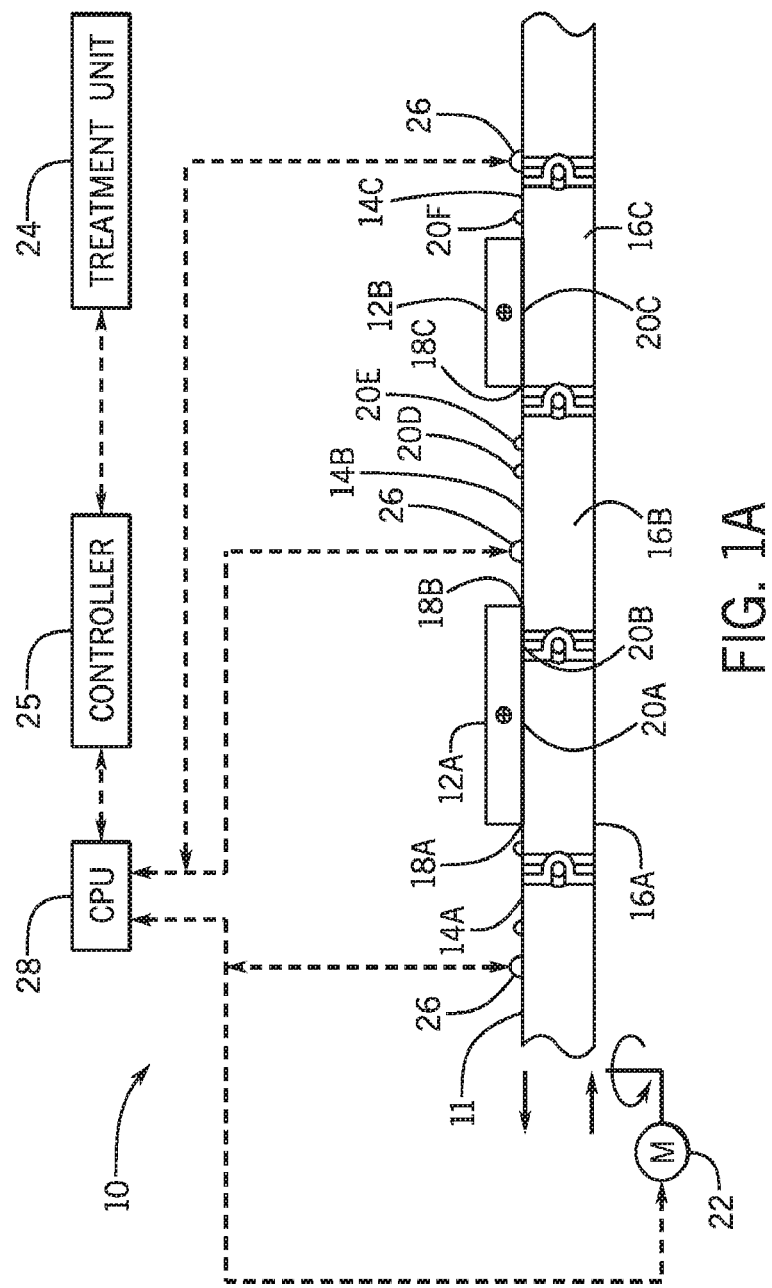

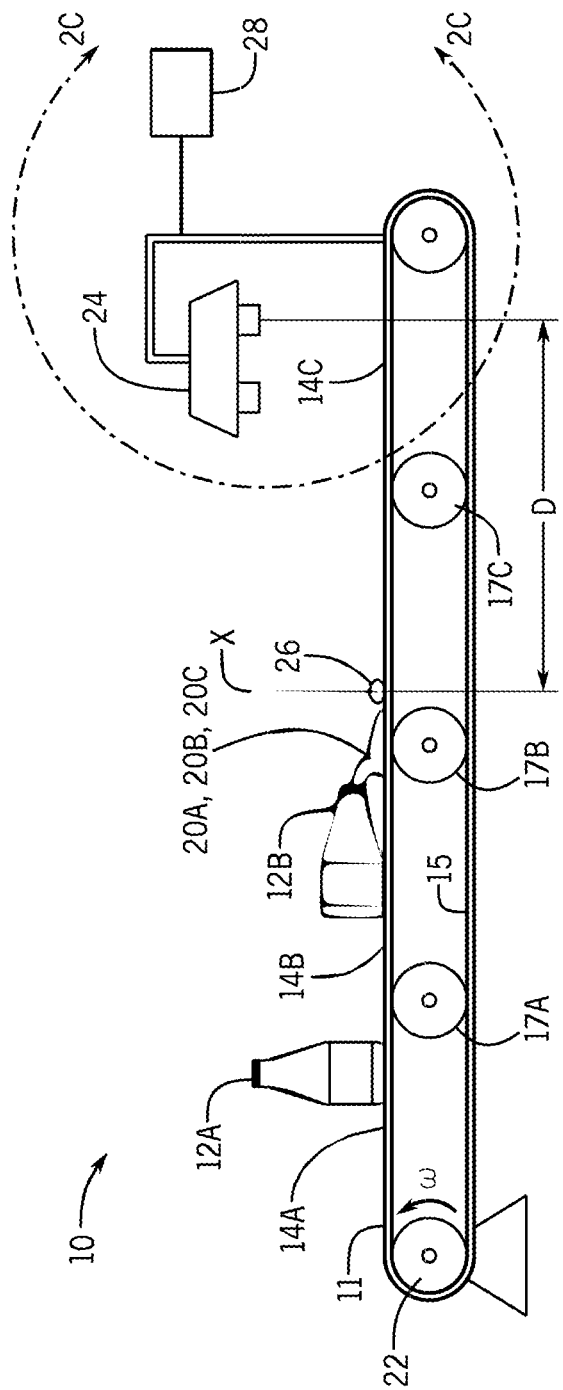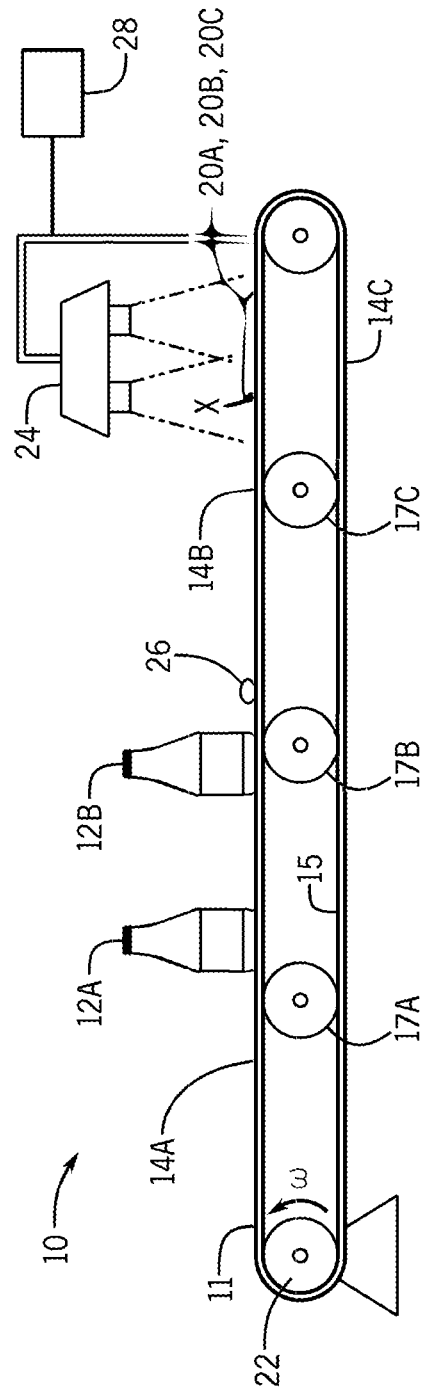

CONVEYOR SYSTEMS AND METHODS

CROSS-REFERENCE TO RELATED APPLICATIONS

This application represents the national stage entry of PCT International Application No. PCT/US2017/049598 filed Aug. 31, 2017, which claims priority from PCT International Application No. PCT/NL2017/050127 filed Mar. 1, 2017, which claims priority to Netherlands Patent Application 2016340 filed Mar. 1, 2016, the contents of which are incorporated herein by reference for all purposes.

BACKGROUND

The present disclosure is described in the context of conveyor systems and methods. More specifically, the present disclosure relates to conveyor systems and methods that monitor, predict, and influence the present and predicted engagement properties imparted by the conveying surface to a conveyed product.

Conveyor systems operate to transport a variety of products and encompass numerous constructions. For example, a conveyor system may be composed of interdigitated plastic link modules adapted to transport beverage products within a beverage bottling plant at rapid and rapidly changing velocities and directions. Alternatively, a conveyor system may include metallic belts adapted to transport baked goods within a bakery at a relatively uniform velocity and direction.

In most applications, the engagement and interface between a conveying surface and the conveyed product is ideally controlled to establish a preferred interaction. The frictional aspects established between the conveying surface and the conveyed product can impact various aspects of the overall process. For instance, frictional engagement outside of a preferred range (e.g., too much relative friction or too little relative friction between the conveying surface and the conveyed product) can result in damage to the conveyed product, excess wear to the conveying surface, and/or general disruption of the orderly conveyance of the conveyed product.

Frictional engagement outside of the preferred range can be caused by a number of different factors, such as the temperature or humidity inside the facility, lubrication exhaustion, or presence of water, cleaning solution, or contaminants on the conveying surface. Particular to the beverage industry, the market-wide transition towards lighter-weight containers with reduced wall thickness has led to a slight increase in leaking containers that emit liquid onto the conveying surface. When the liquid eventually dries, a sticky syrup residue may remain on the conveying surface, which can materially alter the frictional engagement between the conveying surface and the conveyed product. This increased frictional engagement may lead to undesirable operation of the conveyor system (e.g., jamming of the conveyed product), and can lead to conveyor damage or even failure of the conveyor chains and components. If such problems arise, the conveyor may need to be shut down entirely for cleaning and repair, incurring substantial costs in time, lost production, and efficiency.

Therefore, a need exists for improved conveyor systems and methods that monitor, predict, and influence the engagement properties of a conveying surface.

SUMMARY

Some embodiments of the invention provide a method of monitoring and treating contaminants on a conveyor surface, the method comprising: monitoring the conveyor surface with at least one sensor configured to sense a condition on the conveyor surface; detecting the presence of a contaminant on the conveyor surface with the sensor; communicating the presence of the contaminant to a processor; and initiating a treatment cycle to treat the condition on the conveyor surface after the presence of the contaminant on the conveyor surface has been detected.

BRIEF DESCRIPTION OF THE DRAWINGS

FIG. 1A is a schematic illustration of an example conveyor system in accordance with the disclosure.

FIG. 2A is a schematic view of the motor and belt configuration used to drive the conveyor system of FIG. 1.

FIG. 2B is a schematic view of the conveyor system of FIG. 1 cleaning a detected spill area.

DETAILED DESCRIPTION

Figure 1B:
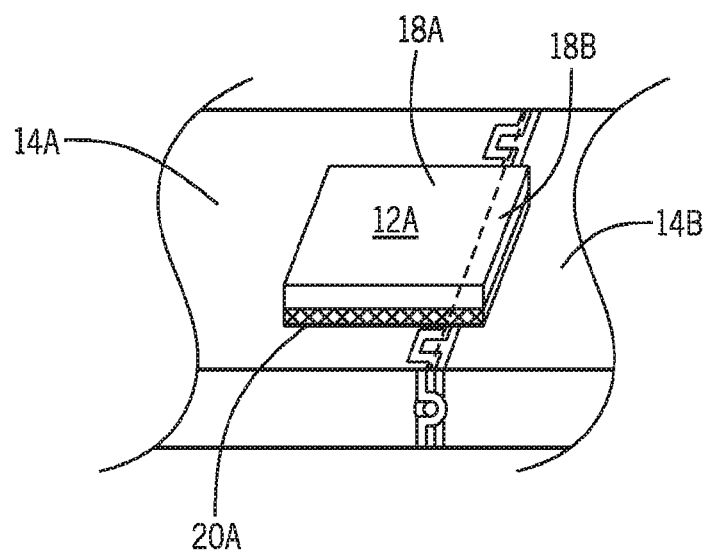
FIG. 1B is a schematic illustration of a portion of the conveyor system of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, modifications to the illustrated embodiments will become apparent to those skilled in the art, and the fundamental principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1A is a schematic illustration of an example conveyor system 10 capable of conveying products 12A, 12B, and monitoring, predicting, and influencing the present and predicted engagement properties imparted by a conveying surface 14A, 14B, 14C of belt modules 16A, 16B, 16C to the products 12A, 12B being transported. To convey products 12A, 12B, conveyor system 10 comprises a belt 11 (e.g., the interconnected belt modules 16A, 16B, 16C shown, a substantially continuous flat belt conveyor, a flat wire belt, etc.) driven by a motor 22. While it is understood that the engagement properties in an interface area 18A, 18B, 18C defined at the engagement between the conveying surface 14A, 14B, 14C and the product 12A, 12B may not be uniform (for example, as shown in FIG. 1B where product 12A straddles two different conveying surfaces 14A, 14B simultaneously), for ease of description, each interface area 18A, 18B, 18C of engagement defined between the respective conveying surface 14A, 14B, 14C and product 12A, 12B portion will be assumed to be uniform within the respective interface area 18A, 18B, 18C. The degree of granularity with which the engagement inquiry is made can be a function of the particular application to which the present concepts are adapted. In addition, the transfer of forces between the conveying surfaces 14A, 14B, 14C to the products 12A, 12B can be influenced, at least in part, by interface substances 20A, 20B, 20C located at the interface areas 18A, 18B, 18C. The interface substances 20A, 20B, 20C can be uniform, distinct, or some combination of substances dispersed continuously or discretely, and can include, for example, particles and/or fluids such as environmental particles and contaminants, manufacturing debris, foodstuffs, cleaning fluids, and lubricants. The interface substances 20A, 20B, 20C, 20D, 20E, 20F can originate from a variety of sources, such as passively by virtue of the surrounding environment, actively in accordance with logic, and/or functionally as a result of the particular product being conveyed.

With additional reference to FIG. 1B, interface substances 20A, 20B, 20C on conveying surfaces 14A, 14B, 14C can be useful in some situations (e.g., cleaning fluids and lubricants) or can be detrimental (e.g., environmental particles and contaminants). Accordingly, in some situations it may be advantageous to remove some or all of interface substances 20A, 20B, 20C from the conveying surfaces 14A, 14B, 14C to maintain acceptable engagement properties in interface areas 18A, 18B, 18C. For example, if a spill occurs, unwanted liquid could be present on the conveying surfaces 14A, 14B, 14C that adversely affects the operation of the conveyor system. In order to return the conveyor system 10 back to an acceptable operating range, the unwanted liquid is preferably removed from the conveyor belt by treatment unit 24, discussed below. In other situations, interface substances 20A, 20B, 20C may be necessary for satisfactory operation of the conveyor system 10. For example, conveyor lubricant may be necessary to allow the belt 11 to continue operating properly in the conveyor system 10. If a less than satisfactory amount of lubricant is detected on conveying surfaces 14A, 14B, 14C, the treatment unit 24 (or a separate lubricant dispensing device (not shown)) may dispense a lubricant composition to introduce additional lubrication into the conveyor system 10, in a manner similar to that disclosed in International Publication Number WO 2015/020524, the contents of which are hereby incorporated by reference in their entirety.

Because some interface substances 20A, 20B, 20C can be harmful to the operation of conveyor system 10 or other conveyor systems, the presence of these substances can be actively monitored and removed when necessary or before they present major issues with the conveyor system 10. In some embodiments, one or more sensors 26 are placed about the conveyor system 10 that can detect the presence of certain unwanted interface substances 20A, 20B, 20C on conveyor surfaces 14A, 14B, 14C. For example, one or more pH sensors 26 can be configured to monitor conveyor belt 11. Such a sensor 26 may be particularly advantageous for use in the beverage industry, as the contents contained within beverage containers are typically acidic in nature. If any of the beverage were to spill on conveyor belt 11, pH sensor 26 could readily detect that a spill has occurred, and could communicate to the central processing unit ("CPU") 28 a time stamp for when the spill was detected and the exact location of the spill, such that a controller 25 in communication with CPU 28 can communicate to the treatment unit 24 that the spilled liquid must be addressed and belt 11 must be treated. In other embodiments of the present disclosure, optical sensors 26 may be used. Such sensors 26 can actively monitor the belt for discoloration caused by the presence of liquid or other contaminants, as will be discussed in more detail below. In still other embodiments, various types of other sensors 26 may be utilized, such as drag sensors, friction sensors, belt temperature sensors in combination with ambient temperature sensors, relative humidity sensors, lubrication sensors, cleaning solution sensors, and the like. In still other forms, image processing can be employed to determine the relative friction between, for example, product 12B and belt module 16C by capturing the relative position of the product 12B over time and determining an average change in velocity and/or acceleration, which can be correlated to a present and a desired frictional engagement between the product 12B and the belt module 16C.

In some embodiments, the one or more sensors 26 in conveyor system 10 are stationary relative to the belt 11, and are configured to detect the presence of interface substances 20A, 20B, 20C, 20D, 20E, 20F on conveyor surfaces 14A, 14B, 14C as they pass through the sensor regions of interest. In other embodiments, the one or more sensors in conveyor system 10 can be integrally molded within conveyor surfaces 14A, 14B, 14C, and can be configured to translate in concert with conveyor belt 11 as it moves about conveyor system 10. In still other embodiments, the one or more sensors 26 may be otherwise coupled to conveyor surfaces 14A, 14B, 14C, such that they are constantly monitoring the same conveyor surface 14A, 14B, 14C during the operation of conveyor system 10. The one or more sensors 26 can be provided with sampling rates such that a sensing cycle occurs about once every second, once every five seconds, once every ten seconds, or at sampling speeds faster or slower yet. Additionally, it should be appreciated that different sampling rates may be used for different types of sensors. Accordingly, in some embodiments the sampling rate amongst sensors 26 present in the conveyor system 10 may differ from sensor to sensor.

When an unwanted interface substance 20A, 20B, 20C, 20D, 20E, 20F is detected on a conveyor surface 14A, 14B, 14C, the conveyor system 10 may initiate a treatment process to address the substance. In order to avoid significant waste of both treatment product and energy, the treatment process may involve locating the specific location of a detected interface substance 20A, 20B, 20C, 20D, 20E, 20F on conveyor surfaces 14A, 14B, 14C and treating only those locations and their immediately surrounding areas. The type and positioning of the sensors relative to conveying surfaces 14A, 14B, 14C may determine the processes necessary to accurately and efficiently perform the aforementioned interface substance treatment process.

In embodiments where each sensor 26 is located in a stationary position in the conveyor system 10, each sensor 26 can be assigned a specific locational value along the conveyor system 10. For example, each sensor 26 may be assigned a locational value corresponding with the distance that sensor is positioned away from the treatment unit 24, which can be fixed at a specific location in the conveyor system 10. Accordingly, each sensor 26 may be configured to communicate to a central processing unit 28 when an unwanted or unexpected interface substance 20A, 20B, 20C, 20D, 20E, 20F is detected on conveyor surfaces 14A, 14B, 14C. Alternatively, each sensor 26 may be configured to communicate to the central processing unit 28 after every measurement taken, and the central processing unit 28 may evaluate each measurement to determine whether action is necessary (immediately or at an approximate future time), for instance, to remove an identified interface substance 20A, 20B, 20C or otherwise impact the frictional engagement properties between the conveying surfaces 14A, 14B, 14C and the products 12A, 12B. Each sensor 26 may be programmed to communicate its specific position relative to the treatment unit 24, the exact time the measurement was taken, and the measurement value obtained by the sensor 26 to the central processing unit 28. Using this data in combination with the motor 22 and conveyor belt 11 parameters, the central processing unit 28 can identify the exact time the conveying surface 14A, 14B, 14C containing interface substance 20A, 20B, 20C will next be within range of the treatment unit 24, and can communicate to controller 25 to activate the treatment unit 24 to remove the substance.

With further reference now to FIGS. 2A and 2B, conveyor system 10 is shown transporting bottles 12A, 12B. As discussed previously, motor 22 drives a belt 11 in conveyor system 10. Motor 22 can be controlled by central processing unit 28 to output a specific, constant motor shaft speed (in RPM). The output shaft of the motor 22 can be coupled to a drive wheel, which can engage conveyor belt driving surface 15. As the drive wheel rotates at the speed of the motor shaft, friction between the drive wheel and driving surface 15 produces no-slip contact between the components, which produces constant conveyor surface 14A, 14B, 14C translation constrained and controlled by belt rollers 17A, 17B, 17C. In some embodiments, belt rollers 17A, 17B, 17C rotate as driving surface 15 contacts them during conveyor surface 14A, 14B, 14C translation. As shown in FIGS. 1A and 1B, conveyor system 10 comprises an endless belt 11 having a finite overall length. Because no-slip contact occurs or can be approximated between the drive wheel and the conveyor belt driving surface 15, the rate of conveyor belt 11 displacement can be readily calculated by knowing the motor speed and drive wheel dimensions. By also knowing the distance away from the cleaning unit 24 and overall length of the conveyor belt 11, the predicted time can be calculated for when a portion of the conveyor belt will be located directly at the treatment unit 24, which can then remove unwanted interface substances 20A, 20B, 20C detected at a specific area.

For example, assume a stationary sensor 26 detects that an unwanted interface substance 20A, 20B, 20C is present on a conveying surface 14A, 14B, 14C at location X on the conveyor belt 11. The sensor 26 may then communicate to the central processing unit 28 that a measurement outside of the acceptable range has been detected, and may similarly provide a time stamp for when the measurement occurred and the distance D of the sensor from/to the treatment unit 24. Because the conveyor belt 11 is an endless belt having a finite length L, location X on the conveyor belt 11 will eventually rotate until it is located directly under the treatment unit 24. However, at the time that an unwanted interface substance 20A, 20B, 20C is detected on conveying surface 14A, 14B, 14C, the distance (in the direction of travel of the conveyor belt 11) between location X and the treatment unit 24 is L−D. Using this distance between location X and the treatment unit 24, the exact time t that location X will be located under the treatment unit 24 can be readily calculated using the following equation:

$$t = (L-D) * \left(\frac{1 \text{ belt } rev}{L}\right) * \left(\frac{N \text{ motor } rev}{1 \text{ belt } rev}\right) * \left(\frac{1 \text{ min}}{\omega \text{ motor } rev}\right) \quad (1)$$

In the above provided equation, quantity N is the ratio of drive wheel circumference to belt length, which can be easily calculated by knowing the diameter of the drive wheel and length of the belt. The angular velocity ω of the motor 22 corresponds to the motor shaft speed which can be controlled by the central processing unit 28.

By calculating the time t until location X will be located under the treatment unit 24, treatment unit 24 can conserve treatment fluid and energy by avoiding cleaning, washing, or otherwise treating portions of conveyor surfaces 14A, 14B, 14C that do not contain any unwanted interface substances 20A, 20B, 20C. By only activating treatment unit 24 when location X is within range, treatment unit 24 uses less resources to provide an effective and targeted treatment to the conveyor system 10. In some embodiments, the treatment unit 24 is entirely passive until a sensor 26 detects an unwanted interface substance 20A, 20B, 20C present on a conveyor surface 14A, 14B, 14C, further conserving energy in the system.

Alternatively, conveyor system 10 may comprise one or more sensors 26 that are coupled to conveyor belt 11 and configured to rotate about conveyor system 10 as the conveyor belt is driven by motor 22. In such embodiments, the sensors 26 communicate with treatment unit 24 differently, as their position relative to treatment unit 24 is constantly changing as conveyor system 10 is operating. In order to utilize a similar high efficiency process as that previously disclosed, the sensors 26 may be configured to communicate their positions relative to the belt at all times once an unwanted interface substance 20A, 20B, 20C has been detected. Each sensor 26 may be configured with a GPS, Bluetooth, RFID, NFC, or other communication system to communicate with the central processor 28 that the sensor 26 (and unwanted interface substance) is approaching the treatment unit.

In some embodiments, the sensor 26 comprises a de-energized RFID tag in a non-transmitting mode when no unwanted interface substances 20A, 20B, 20C are detected by the sensor 26. However, when the sensor 26 detects the presence of an unwanted interface substance, an energy source on the sensor 26 can re-energize the RFID tag, such that it is in a transmitting mode. The treatment unit 24 can be configured with an RFID tag reader that constantly scans for matching RFID tags, and can remain passive until the RFID tag reader detects a matching key. Because the matching key would correspond to a sensor 26 having detected an unwanted interface substance 20A, 20B, 20C, the treatment unit 24 can begin, for example, a washing cycle to remove that unwanted interface substance 20A, 20B, 20C once the RFID tag is in range of the RFID tag reader, and can similarly cease cleaning when the RFID tag is no longer detected (i.e., it is out of range).

Figure 2C:
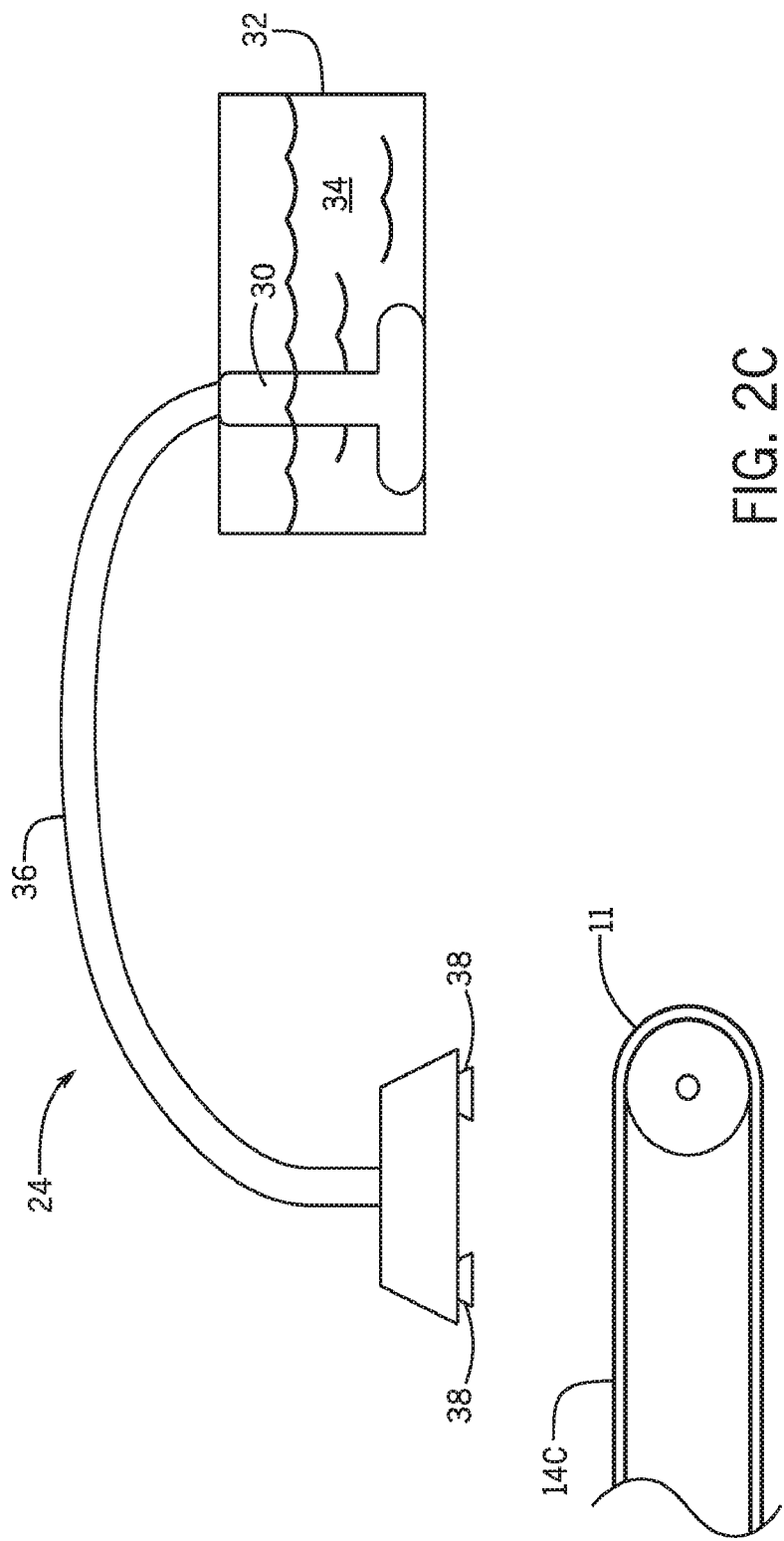
FIG. 2C is a schematic illustration of a portion of the conveyor system of FIG. 2A taken along arc 2C-2C in FIG. 2A.

With further reference now to FIG. 2C, the treatment unit 24 of the conveyor system 10 is shown in greater detail. Treatment unit 24 is configured to dispense fluid onto conveying surfaces 14A, 14B, 14C. In some embodiments, the treatment unit 24 is stationary relative to the conveyor system 10, and can be configured to dispense a cleaning solution onto the conveying surfaces 14A, 14B, 14C (shown in FIG. 2B). For example, treatment unit 24 may be positioned in conveying system 10 such that conveying surfaces 14A, 14B, 14C pass underneath treatment unit 24 during operation. In some embodiments, a cleaning solution may be used that comprises water and an acidic, neutral, or alkaline concentrated cleaning agent. Additionally, treatment unit 24 may be configured to run multiple cycles, such as a washing cycle, a rinsing cycle, a lubrication cycle, a drying cycle, and an ultraviolet cleaning cycle. In such embodiments, the washing cycle may comprise dispensing a cleaning solution onto conveying surfaces 14A, 14B, 14C. Upon completion of the washing cycle, the controller 25 can communicate to the treatment unit 24 to initiate a rinsing cycle. The rinsing cycle may comprise dispensing water onto the conveying surfaces 14A, 14B, 14C to remove any remaining cleaning solution and/or interface substances 20A, 20B, 20C still present on the conveying surfaces 14A, 14B, 14C being washed. Additionally, it should be appreciated that the treatment unit 24 may use no cleaning solution, and instead spray only water onto the conveying surfaces 14A, 14B, 14C to remove interface substances 20A, 20B, 20C. Finally, pressurized gas can also be used to remove interface substances 20A, 20B, 20C. In such embodiments, treatment unit 24 may comprise an air compressor or other pressurized gas source.

The treatment unit 24 may comprise a pump 30, which can be placed in fluid communication (e.g. using a hose 36) with a fluid source 32, lubrication source, and/or other sources to facilitate treatment. Using the pump 30, fluid 34 can be pressurized prior to being dispersed onto conveying surfaces 14A, 14B, 14C. The pump 30 may be configured to compress fluid 34 to pressures between about five pounds per square inch to as high as about five thousand pounds per square inch, or even greater. In some embodiments, the treatment unit 24 may comprise a fluid pressure tank (not shown) which can be configured to store pressurized fluid for cleaning as well. In some embodiments, water from a water source first enters the pump, where it can be pressurized. When the water is pressurized, it can then be stored in a water pressure tank until a cleaning or rinsing cycle begins.

The treatment unit 24 may be configured to dispense fluid at rates as low as 0.25 gallons per minute to as high as five hundred gallons per minute, or even greater. To dispense the fluid, treatment unit 24 may comprise one or more dispensing heads 38. The one or more dispensing heads 38 can be configured to dispense the pressurized fluid in a direction towards conveying surfaces 14A, 14B, 14C such that interface substances 20A, 20B, 20C can be successfully removed and/or the conveying surfaces 14A, 14B, 14C treated. The one or more dispensing heads 38 can be configured to dispense fluid in a number of different patterns. In some embodiments, the dispensing heads 38 are configured to output fluid approximately perpendicular to the conveying surfaces 14A, 14B, 14C. In other embodiments, the dispensing heads 38 may be configured to produce a more cone-shaped fluid pattern, and may disperse fluid at an angle other than perpendicular to the conveying surfaces 14A, 14B, 14C. It will be appreciated that any number of different fluid patterns can be produced by the one or more dispensing heads and remain entirely within the scope of the present disclosure.

The treatment unit 24 may further comprise a drying component (not shown), which can be configured to, for instance, dry a portion of conveying surfaces 14A, 14B, 14C after a wash and/or rinse cycle has been performed. The drying component may utilize a blower, fan, heat, compressed air source, steam, or any combination of these drying mechanisms. In some embodiments, the drying component can be configured to direct compressed air at a high velocity towards conveying surfaces 14A, 14B, 14C. The high velocity air can serve to both dry and displace liquid that remains from any wash and/or rinse cycle that was performed, and can similarly act to displace or remove interface substances 20A, 20B, 20C that might remain on conveying surfaces 14A, 14B, 14C. In other embodiments, a heating element and a blower can be used in conjunction with one another. The air can be passed over the heating element to the blower, which can be configured to direct the heated air (or other gas) towards conveying surfaces 14A, 14B, 14C. The velocity of air or other gas can displace water, cleaning solution, or other interface substances 20A, 20B, 20C from conveying surfaces 14A, 14B, 14C, while heat from the air can evaporate at least a portion of the remaining liquids present on conveying surfaces 14A, 14B, 14C. In some embodiments, the drying component is placed in electrical communication with a controller 25 that is configured to activate the drying component only after a washing or rinsing cycle has been performed, which can help avoid excess energy consumption.

Additionally, it should be appreciated that other types of treatment units 24 may be used within conveyor system 10. For example, some embodiments of conveyor system 10 comprise a steam cleaning unit that utilizes compressed water vapor to quickly clean, dry, and sanitize conveying surfaces 14A, 14B, 14C of conveyor belt 11. In such embodiments, the treatment unit 24 may further comprise a boiler and an insulated tank to heat and store the compressed water vapor for cleaning. In other embodiments of the conveyor system 10, abrasive scrubbing units may be utilized to help complete a cleaning cycle. Abrasive cylinder brushes may be selectively introduced to conveying surfaces 14A, 14B, 14C depending upon the detection of an unwanted material at a specific location on conveyor belt 11. For example, an abrasive cylinder brush may be positioned away from conveyor belt 11 when no unwanted interface substances 20A, 20B, 20C are detected by any of the one or more sensors 26 in conveyor system 10. When an unwanted interface substance 20A, 20B, 20C is detected, a controller 25 may communicate to an actuator to lower the cylinder brush to a position where it then contacts the conveyor belt 11. In some embodiments, friction between the bristles of the brush and the conveyor belt cause the cylinder brush to rotate, thereby causing the brush to selectively remove material present on the conveyor belt. In other embodiments, the cylinder brush may be placed in communication with a motor that causes the cylinder brush to rotate in a direction opposing the direction of conveyor belt travel, and may act to remove contaminants by having helically-oriented bristles. Once the location where unwanted interface substance 20A, 20B, 20C is detected has passed beyond the location of the cylinder brush, the controller 25 can communicate to the actuator to return the cylinder brush to a position away from conveyor belt 11. In some embodiments, the controller 25 may also cause the cylinder brush motor to cease operation once the cylinder brush is returned to a position away from the conveyor belt 11.

It should also be appreciated that in some embodiments of conveyor system 10, multiple different combinations of treatment may be utilized. For example, treatment unit 24 may comprise both a pressurized fluid dispenser and an abrasive scrubbing unit. In other embodiments, the treatment unit 24 may further comprise a drying component. In still other embodiments, the treatment unit 24 may comprise a steam cleaning unit and an abrasive scrubbing unit. In still other embodiments, the treatment unit may comprise both a pressurized cleaning fluid dispenser and a steam cleaning unit. Additionally, some embodiments of the present disclosure may comprise a pressurized fluid dispenser, a steam cleaning unit, and an abrasive scrubbing unit to fully effect a cleaning process.

Figure 3:
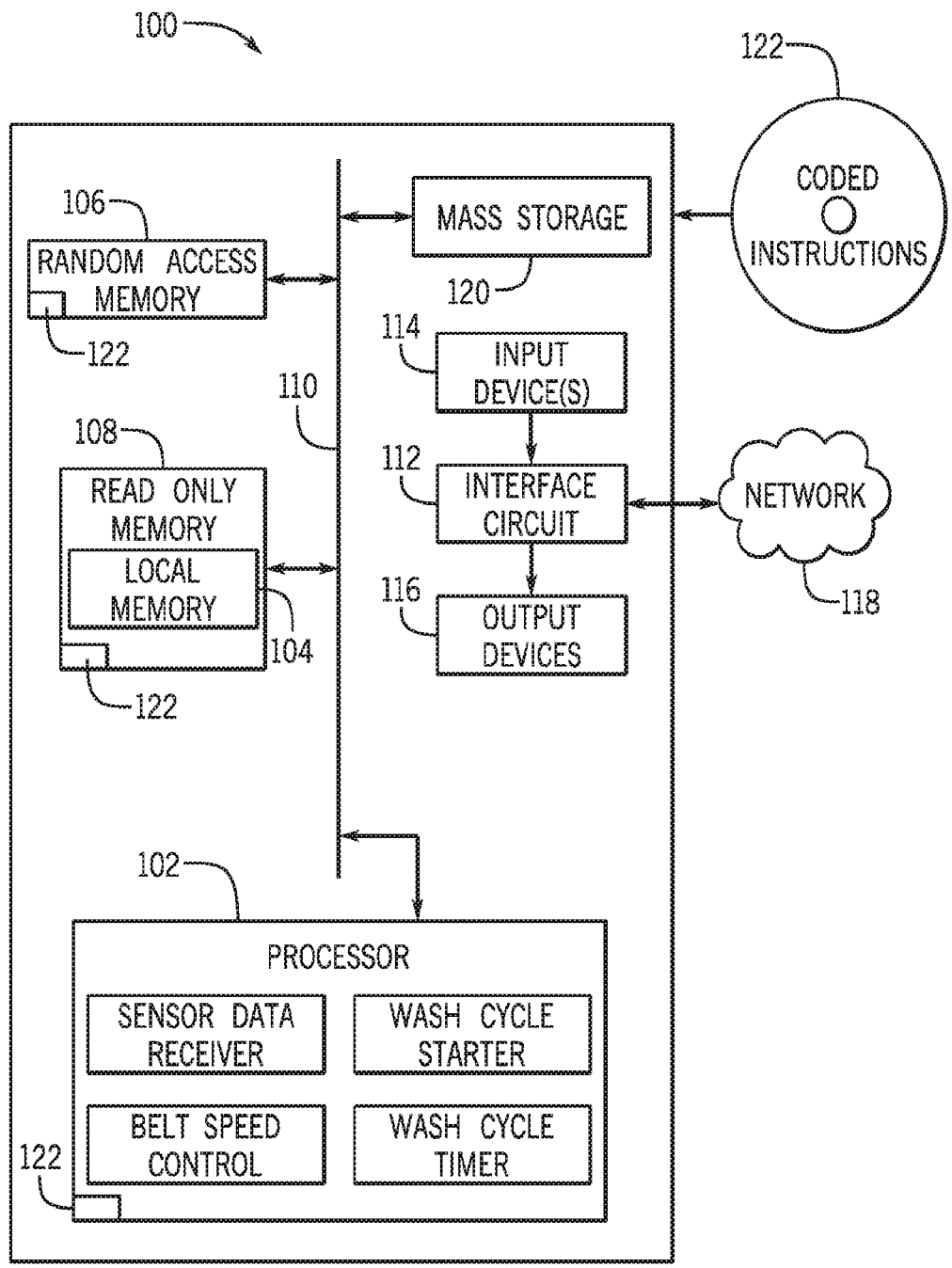
FIG. 3 is a block diagram of an example control system that may be used in conjunction with the conveyor system of FIG. 1.
Figure 4:
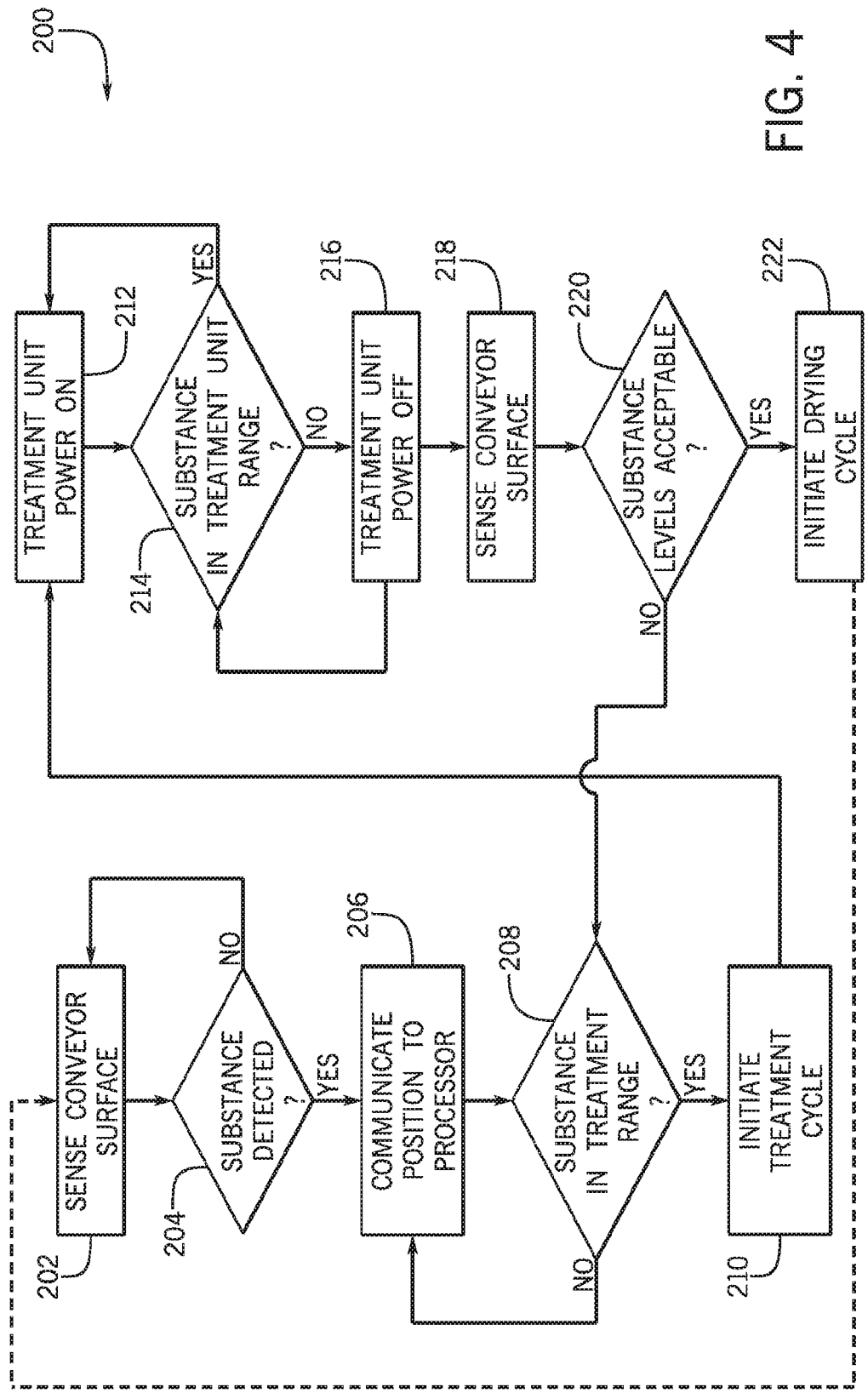
FIG. 4 is a flow chart of an example method in accordance with the disclosure.

Referring now to FIG. 3, a more detailed discussion of the control system used to accomplish the sensing and treatment cycles is provided. Sensors 26 may be placed in electrical communication with a controller 25 that can implement a treatment process when, for instance, an unwanted interface substance is detected by a sensor 26 or the engagement between the conveying surfaces 14A, 14B, 14C and the products 12A, 12B is not presently within expectations or is predicted to become undesirable in practice. The controller 25 may be programmed with machine readable instructions, such as a program for implementing the rinsing, cleaning, or drying cycles discussed in more detail below and shown in FIG. 4. In some embodiments, the program may be executed by a processor 102 such as CPU 28. In some embodiments, the program may be stored on a tangible computer readable storage medium such as a CD-ROM, floppy disk, hard drive, digital versatile disk (DVD), Blu-ray disk, or a memory associated with the CPU 28. Alternatively, the entire program or parts thereof could be executed by a device other than CPU 28, and may be instead embodied in firmware or dedicated hardware. While the example program discussed with reference to FIG. 4 is provided in a specific order, it should be appreciated that many other methods of implementing the example controller program may alternatively be used. For example, the order of execution of the steps may be changed, or some of the steps discussed may be altered, eliminated, or combined.

As mentioned above, the example conveyor operating process 200 shown in FIG. 4 may be implemented using coded instructions (computer readable instructions, for example) stored on a tangible computer readable storage medium such as a hard disk drive, flash memory, read-only memory (ROM), random access memory (RAM), compact disk (CD), digital versatile disk (DVD), cache, or any other storage device in which information can be stored for any duration of time. As used in this application, the term tangible computer readable storage medium includes any type of computer readable storage device or storage disk. Additionally, it should be appreciated that "tangible computer readable storage medium" and "tangible machine readable storage medium" can be used interchangeably, and should be understood to be synonymous. Additionally or alternatively, the example conveyor operating process 200 disclosed in FIG. 4 may be implemented using coded instructions (for example, computer or machine readable instructions) stored on a non-transitory computer or machine readable medium such as a hard disk drive, flash memory, read-only memory, compact disk, digital versatile disk, cache, random-access memory, or any other storage device or disk in which information may be stored for any duration of time. As used in this application, the term non-transitory computer readable medium includes any type of computer readable storage device or disk and excludes propagating signals and transmission media.

FIG. 3 is a block diagram of an example processor platform 100 capable of executing conveyor operating process 200 of FIG. 4 by implementing the example controller of FIGS. 1 and 2. The processor platform 100 can be, for example, a server, a personal computer, a mobile device (i.e., a smart phone, tablet, or cell phone), a personal digital assistant (PDA), or any other type of computing device.

The processor platform 100 includes a processor 102, which is illustrated as hardware. Such a processor 102 may be implemented in integrated circuits, logic circuits, microprocessors, or controllers from any desired family or manufacturer. In some embodiments, processor 102 may be similar to CPU 28, such as that described with respect to FIGS. 1A, 1B, 2A and 2B.

The processor 102 of the illustrated example includes a local memory 104, such as a cache. The example processor 102 executes the instructions of FIG. 4 to implement the example conveyor operating process 200. The processor 102 of the illustrative embodiment is in communication with a main memory including a volatile memory 106 and a non-volatile memory 108 via a bus 110. The volatile memory 106 may be implemented using Synchronous Dynamic Random Access Memory (SDRAM), Dynamic Random Access Memory (DRAM), RAMBUS Dynamic Random Access Memory (RDRAM), or any other type of random access memory device. The non-volatile memory 108 may be implemented by flash memory or any other type of memory suitable for use with processor 102. A memory controller may be used to control volatile memory 106 and non-volatile memory 108.

The processor platform 100 shown in FIG. 3 may also include an interface circuit 112. The input device(s) 114 permit(s) a user to enter data and commands into the processor 102, which can in turn be used to control conveyor system 10. The input device(s) can be implemented by a sensor, microphone, camera (still or video), keyboard, button, mouse, touchscreen, track-pad, trackball, isopoint, voice recognition system, or other input methods suitable for inputting parameters into the controller of conveyor system 10. It should be appreciated that this list of input devices is not exhaustive, and that other input devices may be used to incorporate the systems and methods of the present disclosure.

One or more output devices 116 may also be used in the system. In some embodiments, output devices 116 may be connected to interface circuit 112. The output devices 116 may be implemented by display devices, such as a light emitting diode (LED), organic light emitting diode (OLED), liquid crystal display (LCD), cathode ray tube display (CRT), touchscreen, tactile output device, speakers, or other devices for outputting a signal. The interface circuit 112 may include a graphics driver card, graphics driver chip, or a graphics driver processor to produce and display signals on such output devices 116.

The interface circuit 112 shown in the provided figures also includes a communication device such as a transmitter, receiver, transceiver, modem, or network interface card. Such communication devices facilitate the exchange of data with external machines, such as computing devices of any kind. Such communication may occur via a network 118, such as through an Ethernet connection, a digital subscriber line (DSL), telephone line, coaxial cable, cellular telephone system, or other suitable methods of communicating and transmitting data.

The processor platform 100 may also include one or more mass storage devices 120 for storing software or data. For example, mass storage device 120 may include floppy disk drives, hard disk drives, compact disk drives, Blu-ray disk drives, RAID systems, digital versatile disk (DVD) drives, or other mass storage devices 120 suitable for storing data for any period of time.

In some embodiments, coded instructions 122 to implement conveyor operating process 200 of FIG. 4 may be stored in the mass storage device 120, volatile memory 106, non-volatile memory 108, or on a removable tangible computer readable storage medium such as a CD, DVD, Blu-Ray, floppy disk, or hard disk.

FIG. 4 provides an example conveyor operating process 200 that may be implemented using the methods and conveyor systems 10 disclosed herein with reference to FIGS. 1A-3. As discussed with respect to conveyor system 10, a plurality of different sensors 26 may be used to ensure continuous and improved operation of the conveyor system 10.

Conveyor operating process 200 may begin at block 202, where one or more sensors are actively monitoring conveyor surfaces while the conveyor belt is moving or stationary. As discussed previously with respect to FIGS. 1A-2C, the one or more sensors may be configured to detect a number of different characteristics of the conveyor belt, and may be placed at various intervals about the conveyor belt. As discussed above, the one or more sensors may be configured to detect a pH level on the belt, a discoloration detected on the belt, or other belt properties, such as friction, drag, temperature, level of lubricant present, level of cleaning solution present, or other desirably monitored belt qualities that preferably impact or correlate to the engagement between product and the belt. It should be appreciated that the one or more sensors may be positioned stationary about the conveyor system and may be configured to detect the presence of interface substances on the conveying surfaces at different sampling frequencies as the belt moves past, allowing for nearly real-time detection and response. It should be appreciated that in some embodiments, one or more sensors are configured to travel along with the conveyor belt as it moves, and may be configured to actively monitor a single conveying surface throughout the conveyor system operation.

At decision block 204, the sensors communicate to a CPU whether a substance has been detected on the conveying surfaces of the belt. If there has not been any substances detected on the conveying surfaces of the belt, the process returns to block 202, and the sensors and CPU continue to monitor the conveyor belt. If a substance has been detected, the CPU may inquire the sensor to provide the position of the sensor 206. In some embodiments, the position may be the coordinates of the specific sensor relative to a treatment unit. In other embodiments, the position may correspond to a specific location on the belt, which the CPU may then use to determine the distance between the conveying surface with substances detected and the treatment unit.

At block 208, the CPU determines whether the substance that was detected is within range of the treatment unit. Relying on the positional data relayed by the sensors to the CPU, the CPU may calculate the projected time until the substance detected is within range of the treatment unit. If the CPU calculates that the substance is not positioned within range of the treatment unit, the CPU may again inquire the sensor to provide positional data about where the substance was detected. In some embodiments, this process can result in updated data about the location of a spill and can provide multiple measurements to the CPU to allow for an even more accurate determination of when the substance is located within range of the treatment unit.

If the CPU does determine that the substance detected is within range of the treatment unit, a treatment cycle, such as a wash cycle, may be initiated at block 210. The wash cycle may first involve powering on the treatment unit at block 212. In some embodiments, a pump in the treatment unit may be powered up when the treatment unit is powered on, and may be configured to pressurize a cleaning solution, lubrication, water, or other fluid present in a fluid reservoir. The treatment unit may then expel pressurized fluid towards the conveying surface, which may act to remove the detected substance from the conveyor belt or otherwise impact the engagement properties between the product and the belt (e.g., increase or decrease relative friction).

The position of the detected substance relative to the treatment unit is continuously monitored at block 214, which determines whether or not the power of the treatment unit should remain on (when the detected substance is within range of the treatment unit) or should be turned off (when the detected substance is out of range of the treatment unit). The position of the substance relative to the cleaning unit may once again be determined by the CPU (e.g., using equation 1 above), or could instead be monitored by sensors present within the range of the treatment unit, among other options. Alternatively or additionally to add redundancy to the calculation of the position of the substance relative to the treatment unit, the position of the substance may be continuously transmitted to the CPU by a sensor detecting a specific location on the belt continuously. If the substance is within range of the treatment unit, the treatment unit may remain on and may continue to dispense fluid onto the conveying surfaces of the conveyor belt.

When the substance is no longer in range, the treatment unit may be powered off at block 216. In some embodiments, the treatment unit may cease to dispense cleaning fluid onto the conveying surfaces of the conveyor belt once the treatment unit has been powered off. After the treatment unit has been powered off, the surface of the conveyor is once again sensed at block 218. The sensing process may take place via any of the one or more sensors present in the conveyor system. Using electrical communication between the one or more sensors and tolerance levels stored within the CPU, the acceptability of the conveyor surfaces after treatment can be evaluated at process block 220. If the substances detected on the conveying surfaces of the conveyor belt are still determined to be higher than acceptable, the process may return to decision block 208, where the CPU communicates with the one or more sensors to determine whether or not the substances on the conveying surface are within range of the treatment unit.

If the substance levels on the conveying surfaces detected by the one or more sensors are within the tolerance stored within the CPU unit, the process may then optionally initiate a drying cycle at block 222, which may selectively dry the portion of the conveyor belt that was washed during the cleaning cycle. It should be appreciated, however, that the drying cycle may be omitted entirely. In some embodiments, the entire process 200 restarts after completion of the drying cycle at block 222.

It should also be appreciated that the process 200 may be used to monitor many locations along the belt, and that each sensor may be simultaneously performing a different block of the process 200 at various times during operation of the conveyor system. In some embodiments, the CPU may be given a specific command hierarchy to ensure that treatment (e.g., washing) occurs at the proper times, and to ensure that operation of the conveyor remains properly ongoing in different blocks at different times during conveyor belt operation. For example, even when the wash cycle has been initiated and the wash unit power is on, the one or more sensors may be configured to continue sensing the conveyor surfaces for additional substances, and may continue to repeat blocks 202 and 204 during this process. Additionally, when the treatment unit is powered off because one substance is detected to be within the accepted tolerance levels, a substance at another location on the conveying surface may be detected (e.g., at process block 202) to be within the range of the washer, which then requires the treatment unit to be powered on. Accordingly, the command to turn the treatment unit off at block 216 may be effectively overridden when a different substance is detected at 208 within the washer range, such that the treatment unit remains on.

Figure 5A:
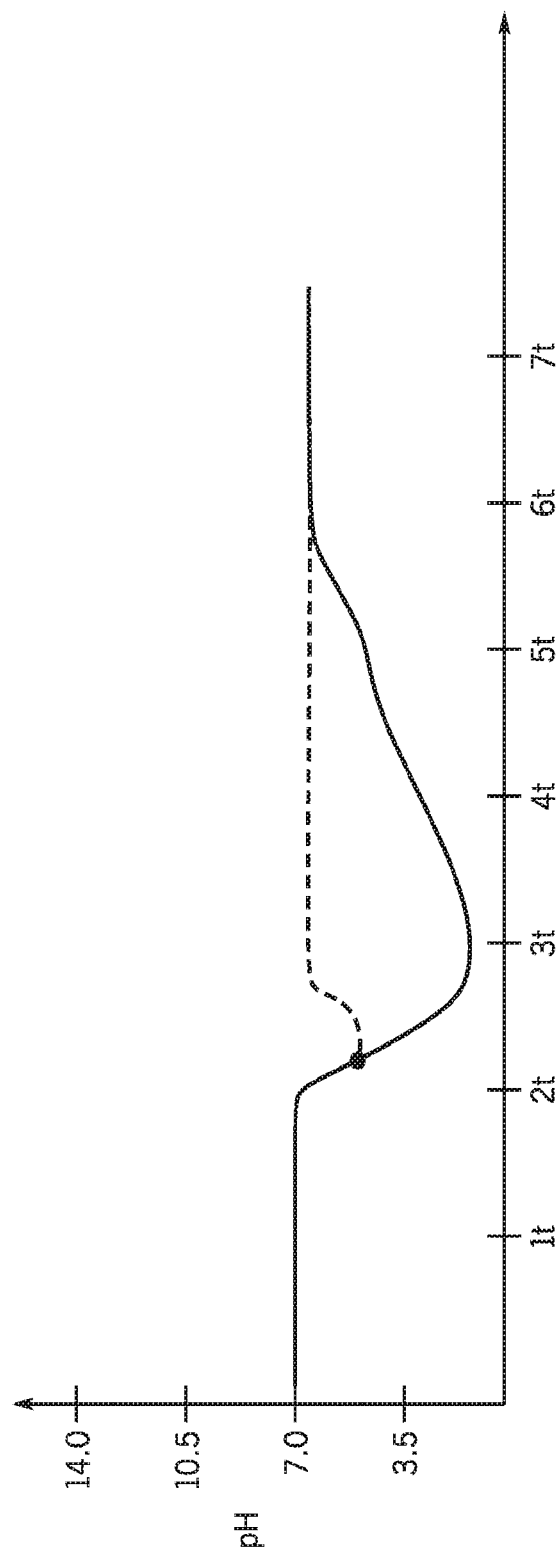
FIG. 5A is plot of the pH over time.
Figure 5B:
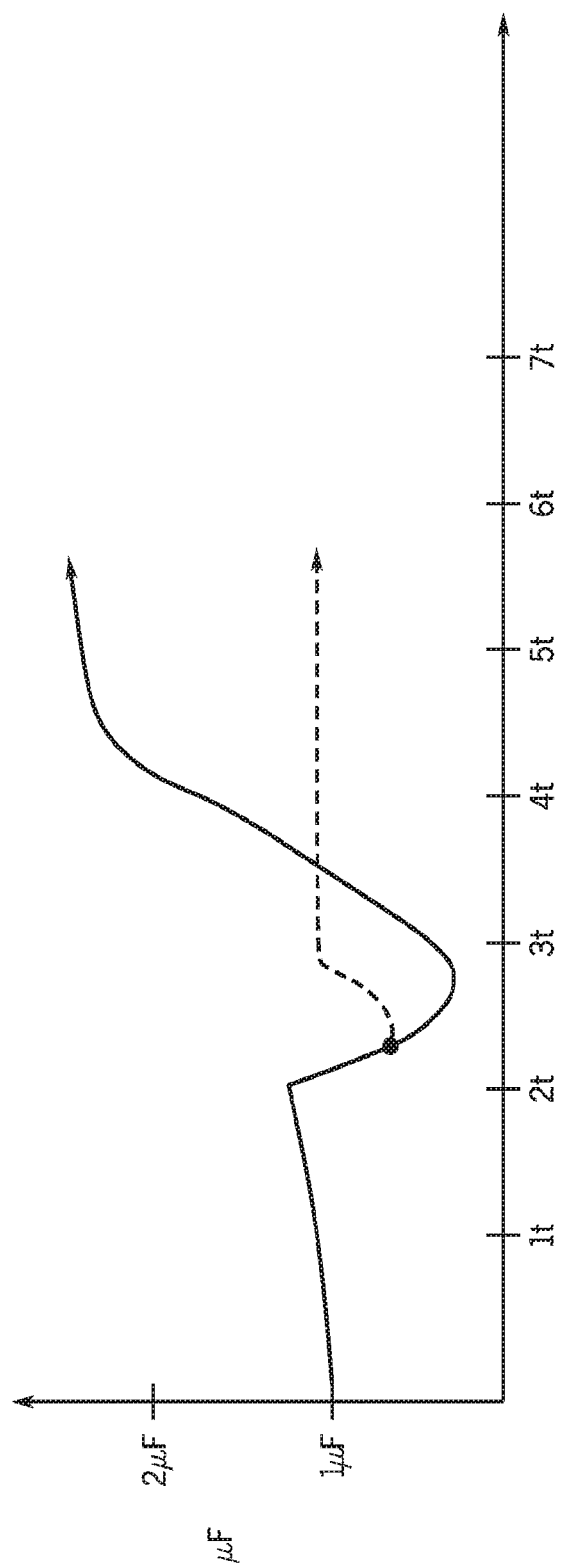
FIG. 5B is a plot of the coefficient of friction over time.

Referring now to FIGS. 5A and 5B, with further reference to FIG. 4 and FIGS. 1A and 1B, a process for monitoring, predicting, and influencing the engagement properties of a conveying surface is disclosed. For purposes of clarity and understanding, the untreated spill condition is represented by the solid lines in FIGS. 5A and 5B, while the treated spill condition is represented by the dashed lines shown in those figures. In the illustrative example, conveyor system transports beverages and contains one or more pH sensors 26 placed along various intervals in the conveyor system 10. As conveyor system 10 is in normal operation, conveyor belt 11 may maintain a pH around neutral (i.e., around 7.0), as shown between time 0t and time 2t. While the friction experienced between products 12A, 12B and conveying surfaces 14A, 14B, 14C at interface areas 18A, 18B, 18C increases slowly over time as various interface substances 20A, 20B, 20C accumulate on conveying surfaces and any lubrication dissipates, this natural accumulation of matter is expected and accounted for during conveyor belt 11 operation. Once the buildup of interface substances 20A, 20B, 20C increases to a point that the friction experienced between products 12A, 12B and conveying surfaces 14A, 14B, 14C is no longer acceptable, treatment can be carried out, such as a washing process to clean the entire conveyor belt 11, or other treatment processes to alter lubricity, as part of normal system maintenance.

In some situations (such as that shown in FIG. 2A), a bottle may spill or leak some or all of its contents onto conveying surfaces 14A, 14B, 14C, as indicated in FIGS. 5A and 5B at time 2t. Because most beverages are slightly to moderately acidic in nature, an initial drop in pH occurs at the location of the spill, which is measured by the one or more pH sensors 26 present in conveyor system 10 at time 3t. Because the interface substance 20A, 20B, 20C spilled or leaking onto conveying surfaces 14A, 14B, 14C is initially a liquid, the frictional forces at interface areas 18A, 18B, 18C initially decrease, as the liquid present on conveying surfaces 14A, 14B, 14C acts as a lubricant between products 12A, 12B and conveying surfaces 14A, 14B, 14C. Accordingly, the frictional forces at interface areas 18A, 18B, 18C hit a local minimum between time 2t and 3t.

In the methods and systems of the present disclosure, the initial drop in pH is detected by the one or more sensors 26, which relays that signal to CPU 28 to effectuate a conveyor operating process 200 at the location where the unwanted interface substance 20A, 20B, 20C was sensed. The one or more sensors 26 which detect the change in pH effectively predict that a future problem area on the conveyor belt 11 will develop, as would occur if the spill or leak was untreated. As can be seen in FIGS. 5A and 5B, the spill begins to dry at time 3t, which causes an increase in frictional force and an increase in pH. In many cases, the dried beverage leaves behind a sticky syrupy residue, which greatly increases the frictional forces at interface areas 18A, 18B, 18C, at time 4t to time 5t and beyond. Such increased frictional forces may cause improper engagement between conveying surfaces 14A, 14B, 14C and products 12A, 12B, which may eventually lead to jam ups of containers, container damage, or even failure of the conveyor chains, belt, or other components, and may require total conveyor system 10 shutdown.

In order to avoid such undesirable consequences, one or more sensors 26 actively monitor conveyor surfaces 14A, 14B, 14C on conveyor belt 11 to ensure that any spilled liquid or interface substances 20A, 20B, 20C that may eventually cause frictional issues on belt 11 are removed before they result in undesirable operation. As shown in FIGS. 5A and 5B, a conveyor operating process 200 may be initiated shortly after an initial drop in pH is detected by any of the sensors 26. As discussed previously with respect to treatment unit 24, the treatment unit 24 may remain passive until any of the one or more sensors 26 detects an initial contaminant present on conveying surfaces 14A, 14B, 14C. Measurements taken by sensor 26 may be analyzed directly by a control unit, analyzed by an auxiliary monitoring unit, or sent to a remote location to be analyzed. If the signal is determined to contain or predict an unacceptable condition (e.g., detected contaminants, relative friction outside of a desired range, excessive rate of change in relative friction), the CPU 28 can initiate a process to remove the interface substances 20A, 20B, 20C from or otherwise treat the conveying surfaces 14A, 14B, 14C. In some embodiments, the cleaning process is initiated between time 2t and time 3t, which can be configured to provide a cleaning solution, a rinse cycle, a combination of the two, or other treatment to remove unwanted interface substance 20A, 20B, 20C from conveying surfaces 14A, 14B, 14C and establish the desired engagement properties. In order to further save water and energy, the treatment unit 24 could remain in an unpowered or low power state until the unacceptable interface substance 20A, 20B, 20C is within range of the treatment unit 24. To effectuate this process, CPU 28 may once again rely upon the position data provided by the sensor 26 which detected the presence of the contaminant. Using this same position data, the treatment unit 24 may also detect when the conveyor surface 14A, 14B, 14C containing the unwanted interface substance 20A, 20B, 20C has past outside the range of the treatment unit 24, at which point the treatment unit may return to a low power or unpowered state.

In some embodiments, the CPU 28 may be provided with an acceptable range of pH values, such that the cleaning process continues until the one or more sensors 26 indicates that the pH present on the belt has returned within an acceptable range of values. When the one or more sensors 26 indicates that the pH present on the belt has returned to a value within the acceptable range of values, the washing and/or rinsing cycles may be terminated, and a drying cycle may begin. In the figures provided, drying cycle may begin around time 3t, when the pH is detected to be approximately neutral. Using this system, conveyor system 10 can actively monitor conveying surfaces 14A, 14B, 14C for unwanted interface substances 20A, 20B, 20C, and can effectively deal with any potential issues that these interface substances 20A, 20B, 20C may cause prior to the belt or transported products 12A, 12B experiencing any catastrophic failures that require extensive system shutdown or maintenance.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A method of monitoring and treating contaminants on a conveyor surface, the method comprising:
    monitoring the conveyor surface with a pH sensor configured to sense a pH a condition value on the conveyor surface;
    detecting a presence of a contaminant on the conveyor surface when the pH sensor senses that the pH condition value has decreased;
    communicating the presence of the contaminant as indicated by the pH sensor to a processor;
    determining, with the processor, to initiate a treatment cycle of a treatment unit when the pH condition value decreases below an acceptable range of pH condition values that is indicative of a future increase in a relative coefficient of friction between the conveyor surface and a conveyed product; and
    initiating, with the processor, the treatment cycle to treat the contaminant on the conveyor surface by increasing the pH condition value toward the acceptable range of pH condition values after the presence of the contaminant on the conveyor surface has been detected.

2. The method of claim 1, wherein the method further comprises the step of determining, with the processor, to terminate the treatment cycle when the pH sensor senses that the pH condition value is within the acceptable range of pH condition values.

3. The method of claim 2, wherein the method further comprises initiating, with the processor, a drying cycle after the treatment cycle has been terminated.

4. The method of claim 1, wherein the contaminant is a liquid and the treatment cycle removes the liquid prior to the liquid evaporating from the conveyor surface.

5. The method of claim 1, wherein the method further comprises monitoring the conveyor surface with an optical sensor configured to monitor the conveyor surface for discoloration.

6. The method of claim 1, wherein the treatment cycle is performed by the treatment unit that is stationary and positioned over a portion of the conveyor surface.

7. The method of claim 1, wherein the step of determining, with the processor, to initiate the treatment cycle of the treatment unit when the pH condition value decreases below the acceptable range of pH condition values further includes initiating the treatment cycle prior to the pH sensor sensing a subsequent pH condition value that is increasing toward the acceptable range of pH condition values to detect the presence of the contaminant on the conveyor surface and remove the contaminant prior to the relative coefficient of friction between the conveyor surface and the conveyed product increasing above a desired coefficient of friction between the conveyor surface and the conveyed product.

8. The method of claim 1, wherein the step of detecting further comprises detecting a position of the contaminant on the conveyor surface, and the step of determining, with the processor, to initiate the treatment cycle further comprises initiating the treatment cycle when the position of the contaminant detected on the conveyor surface is present within a treatment range of the treatment unit.

9. The method of claim 8, wherein the treatment unit comprises a pump configured to compress a fluid within a fluid source and dispense compressed fluid onto the conveyor surface.

10. The method of claim 8, wherein the determination of whether the contaminant on the conveyor surface is present within the treatment range of the treatment unit is determined by the processor which is configured to calculate a distance between the contaminant detected and the treatment unit using a position of the pH sensor that detected the presence of the contaminant on the conveyor surface, a position of the treatment unit, and a rate of displacement of the conveyor surface relative to the treatment unit.

11. The method of claim 8, wherein the treatment unit comprises an RFID tag reader configured to read active RFID tags and initiate the treatment cycle based upon a detected active RFID tag and wherein the pH sensor is coupled to a semi-passive RFID tag, the pH sensor being configured to communicate to a power source to activate the semi-passive RFID tag when the presence of the contaminant is detected on the conveyor surface, and wherein the range of detection of the RFID tag reader is chosen to correspond approximately to the treatment range of the treatment unit.

12. The method of claim 1, wherein the treatment cycle comprises applying a lubricant to the conveyor surface.

13. The method of claim 1, wherein a plurality of sensors are positioned stationarily about the conveyor surface and the conveyor surface is configured to move relative to at least one of the plurality of sensors.

14. The method of claim 1, wherein the step of determining, with the processor, to initiate the treatment cycle of the treatment unit when the pH condition value decreases below the acceptable range of pH condition values further includes initiating the treatment cycle when the pH sensor senses a subsequent pH condition value that is decreasing relative to the pH condition value and that is continuing to decrease relative to the acceptable range of pH condition values, to remove the contaminant prior to the relative coefficient of friction between the conveyor surface and the conveyed product increasing above a desired coefficient of friction between the conveyor surface and the conveyed product.

15. The method of claim 1, further comprising:
    detecting a subsequent pH condition value with the pH sensor; and
    determining, with the processor, to terminate the treatment cycle when the subsequent pH condition value is within the acceptable range of pH condition values.

16. A method of monitoring and treating contaminants on a conveyor surface, the method comprising:
    monitoring the conveyor surface with at least one sensor configured to sense a condition on the conveyor surface;
    detecting the presence of a contaminant on the conveyor surface with the sensor;
    communicating the presence of the contaminant to a processor; and
    initiating a treatment cycle to treat the condition on the conveyor surface after the presence of the contaminant on the conveyor surface has been detected;

wherein the treatment cycle is initiated when the contaminant detected on the conveyor surface is present within a fluid dispensing range of a treatment unit; and wherein the determination of whether the contaminant on the conveyor surface is present within the fluid dispensing range of the treatment unit is determined by a processor which is configured to calculate a distance between the contaminant detected and the treatment unit using a position of the sensor that detected the presence of the contaminant on the conveyor surface, a position of the treatment unit, and a rate of displacement of the conveyor surface relative to the treatment unit.

17. A method of monitoring and treating contaminants on a conveyor surface, the method comprising:

monitoring the conveyor surface with at least one sensor configured to sense a condition on the conveyor surface;

detecting the presence of a contaminant on the conveyor surface with the sensor;

communicating the presence of the contaminant to a processor; and initiating a treatment cycle to treat the condition on the conveyor surface after the presence of the contaminant on the conveyor surface has been detected;

wherein the treatment cycle is initiated when the contaminant detected on the conveyor surface is present within a fluid dispensing range of a treatment unit; and wherein the treatment unit comprises an RFID tag reader configured to read active RFID tags and initiate the treatment cycle based upon a detected active RFID tag and wherein the sensor is coupled to a semi-passive RFID tag, the sensor being configured to communicate to a power source to activate the semi-passive RFID tag when the presence of the contaminant is detected on the conveyor surface, and wherein the range of detection of the RFID tag reader is chosen to correspond approximately to the fluid dispensing range of the treatment unit.

* * * * *